(12) United States Patent
Yahata

(10) Patent No.: US 8,941,749 B2
(45) Date of Patent: Jan. 27, 2015

(54) IMAGE PROCESSING APPARATUS AND METHOD FOR IMAGE SYNTHESIS

(75) Inventor: Kazuhiro Yahata, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/447,527

(22) Filed: Apr. 16, 2012

(65) Prior Publication Data

US 2012/0287329 A1 Nov. 15, 2012

(30) Foreign Application Priority Data

May 9, 2011 (JP) .................................. 2011-104745
Apr. 6, 2012 (JP) .................................. 2012-087938

(51) Int. Cl.
| | | |
|---|---|---|
| *H04N 5/225* | (2006.01) | |
| *H04N 5/232* | (2006.01) | |
| *G06T 5/50* | (2006.01) | |
| *G06T 3/40* | (2006.01) | |
| *H04N 13/00* | (2006.01) | |

(52) U.S. Cl.
CPC .............. *H04N 5/23232* (2013.01); *G06T 5/50* (2013.01); *G06T 3/4053* (2013.01); *H04N 2013/0088* (2013.01); *G06T 2200/21* (2013.01); *G06T 2207/10052* (2013.01)
USPC ....................................... 348/218.1; 348/345

(58) Field of Classification Search
None
See application file for complete search history.

(56) References Cited

U.S. PATENT DOCUMENTS

| | | |
|---|---|---|
| 6,236,748 B1 | 5/2001 | Iijima et al. |
| 7,986,343 B2 | 7/2011 | Kumagai et al. |
| 2012/0147205 A1* | 6/2012 | Lelescu et al. ............. 348/218.1 |

FOREIGN PATENT DOCUMENTS

| | | |
|---|---|---|
| JP | 2002-342788 A | 11/2002 |
| JP | 2006-135823 A | 5/2006 |
| JP | 2010-073035 A | 4/2010 |
| WO | 2010/013471 A1 | 2/2010 |
| WO | 2010/119852 A1 | 10/2010 |

OTHER PUBLICATIONS

"Light Field Photography with a Hand-held Plenoptic Camera" by Ren Ng et al., Stanford Tech Report, Apr. 20, 2005.
"Dynamically Reparameterized Light Fields" by Aaron Isaksen et al., SIGGRAPH 2000 Proceeding of the 27th Annual Conference on Computer Graphics and Interactive Techniques, 2000.
"Superresolution with Plenoptic Camera 2.0" Todor Georgiev et al., Adobe Technical Report, Apr. 2009.
"Super-resolution Image Reconstruction: A Technical Overview" Sung C. Park et al., IEEE Signal Processing Magazine, p. 21, May 2003.

* cited by examiner

*Primary Examiner* — Twyler Haskins
*Assistant Examiner* — Angel L Garces-Rivera
(74) *Attorney, Agent, or Firm* — Fitzpatrick, Cella, Harper & Scinto

(57) ABSTRACT

A plurality of first image data having a first resolution, which are obtained by capturing images from a plurality of viewpoints, and capturing information in the capturing operation are input. Based on the capturing information, a plurality of candidate values are set as a synthesis parameter required to synthesize second image data having a second resolution higher than the first resolution from the first image data. Using a candidate value selected from the plurality of candidate values as a synthesis parameter, the second image data is synthesized from the plurality of first image data.

18 Claims, 9 Drawing Sheets

F I G. 1
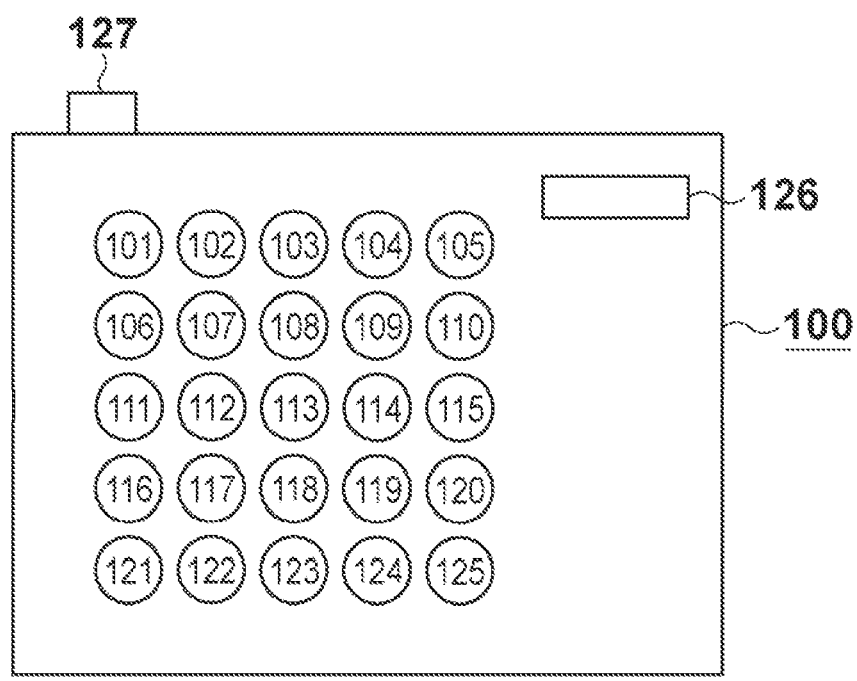

F I G. 9A 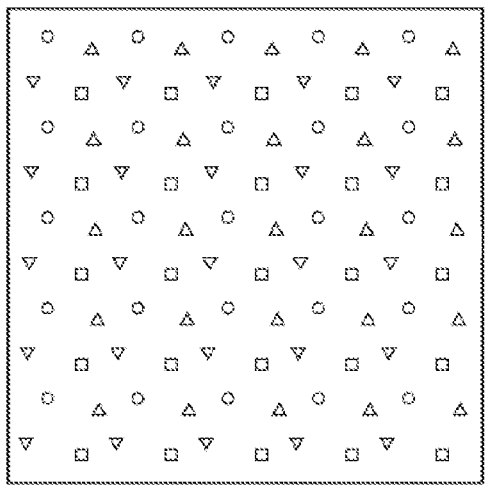
F I G. 9B 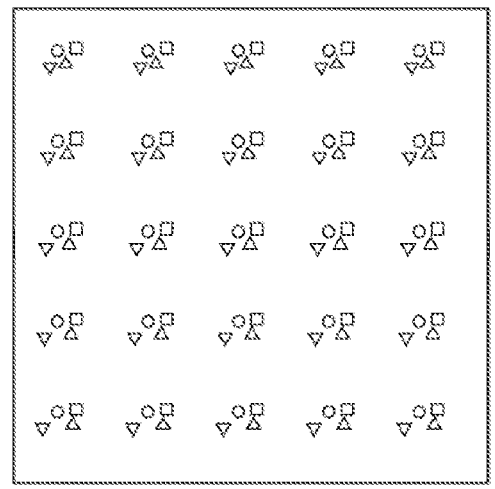

IMAGE PROCESSING APPARATUS AND METHOD FOR IMAGE SYNTHESIS

BACKGROUND OF THE INVENTION

1. Field of the Invention

The present invention relates to image processing for changing a focus, depth of field, and the like of a captured photo image.

2. Description of the Related Art

A method of changing a focus, depth of field, and the like of a captured photo image has been proposed. For example, R. Ng, M. Levoy, et al. "Light Field Photography with a Hand-Held Plenoptic Camera" Stanford University Computer Science Tech Report CSTR 2005-02, April 2005 discloses an arrangement of a plenoptic camera which records a light ray state inside a capturing optical system, and a development method for changing a focus of (refocusing) a captured photo image. Also, A. Isaksen, et al. "Dynamically Reparameterized Light Fields" ACM SIGGRAPH, pp. 297-306 (2000) discloses a method of generating an image, a depth of field of which is changed (to be referred to as depth of field control hereinafter) from images of a multiple camera having a plurality of capturing devices, which are compact and have a deep depth of field.

In general, in a multiple camera prepared by laying out a plurality of compact cameras, each camera has a small number of pixels and a low resolution due to a compact camera. The plenoptic camera has a lower spatial resolution than a normal camera having the same number of pixels as the plenoptic camera.

T. Georgiev and A. Lumsdaine "Superresolution with Plenoptic 2.0 cameras" Adobe Technical Report (2009) discloses a method of increasing a resolution by executing super resolution processing when data acquired by a plenoptic camera are developed. In case of a multiple camera, a plurality of low-resolution images including an object having slight position shifts are obtained. A technique for obtaining one high-resolution image from these low-resolution images by super resolution processing is known (for example, Sung C. P. and Min K. P. "Super-Resolution Image Reconstruction: A Technical Overview" IEEE Signal Proc. Magazine, Vol. 26, No. 3, p. 21-36 (2003)).

In order to execute the super resolution processing in the multiple camera, a plurality of images having position shifts, which are not integer multiples of a pixel size, or pieces of information equivalent to them are required. However, the multiple camera attains refocusing and depth of field control by shifting images of individual cameras and superposing these images. For this reason, no position shift is generated depending on a distance to be focused and depth of field. In such case, even when the super resolution processing is executed, not only a satisfactory high-resolution image cannot be obtained, but also an image having low image quality, which is hard to be appreciated, is generated due to generation of ringing and the like.

SUMMARY OF THE INVENTION

In one aspect, an image processing method comprising the steps of: inputting a plurality of first image data having a first resolution, which image data are obtained by capturing images from a plurality of viewpoints, and capturing information in the capturing operation; setting a plurality of candidate values as a synthesis parameter required to synthesize second image data having a second resolution higher than the first resolution from the first image data based on the capturing information; selecting one candidate value from the plurality of candidate values; and synthesizing the second image data from the plurality of first image data using the selected candidate value as the synthesis parameter.

According to the aspect, a synthesis parameter which allows appropriate processing when image data having a second resolution higher than a first resolution is synthesized from a plurality of image data having the first resolution can be set.

Further features of the present invention will become apparent from the following description of exemplary embodiments with reference to the attached drawings.

BRIEF DESCRIPTION OF THE DRAWINGS

FIG. 1 is a schematic view showing a capturing apparatus according to an embodiment.

FIGS. 9A and 9B are views for explaining a correspondence relationship of pixel positions.

DESCRIPTION OF THE EMBODIMENTS

Figure 2:
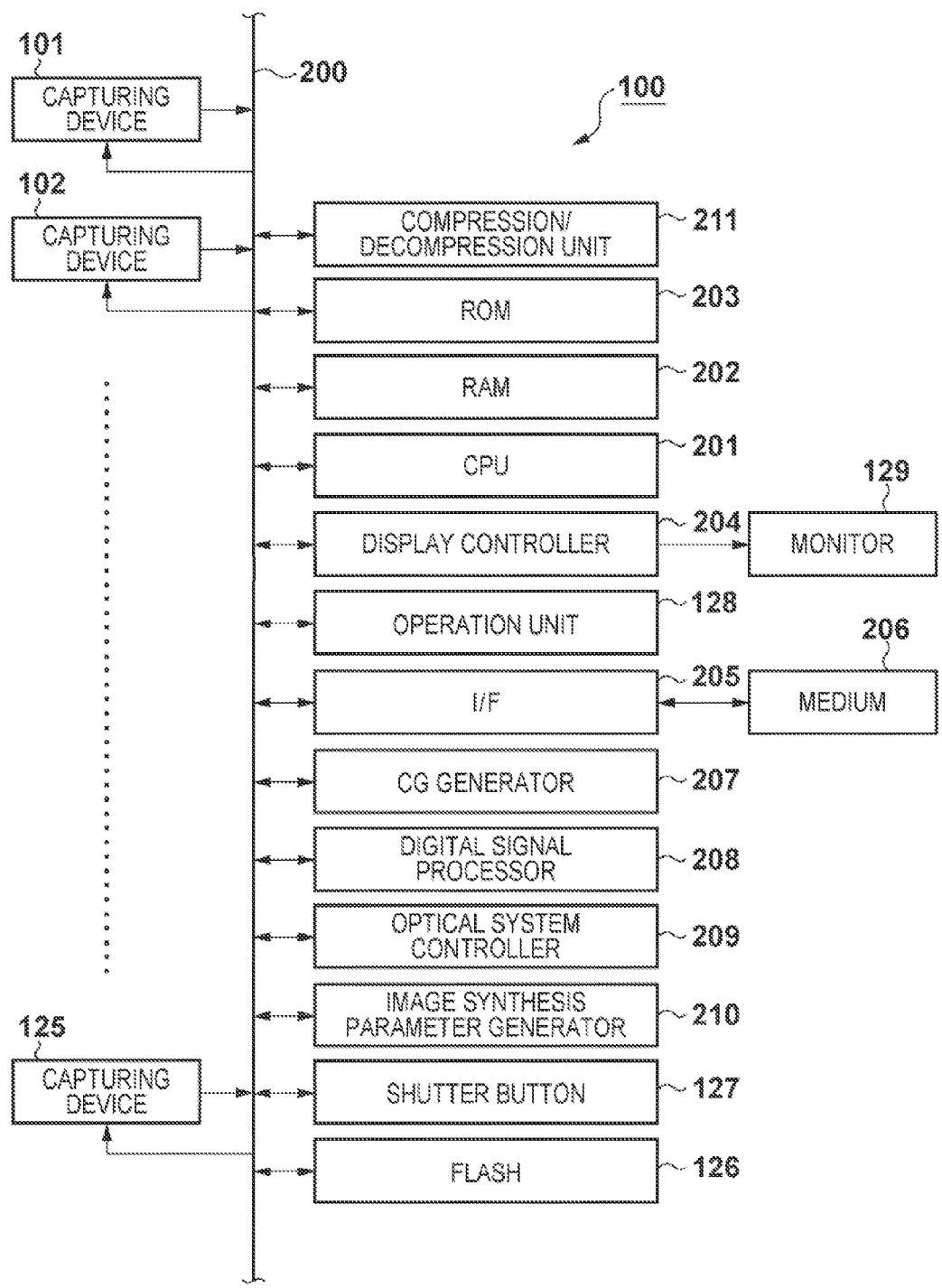
FIG. 2 is a block diagram for explaining the arrangement of the capturing apparatus.

Image processing according to an embodiment of the present invention will be described in detail hereinafter with reference to the drawings.

[Arrangement of Capturing Apparatus]

FIG. 1 schematically shows a capturing apparatus 100 according to an embodiment. The capturing apparatus 100 is a so-called multiple camera having 25 capturing devices 101 to 125 on its front surface (object side). The capturing apparatus 100 includes a flash 126 and shutter button 127. Although not shown in FIG. 1, the capturing apparatus 100 has an operation unit, display unit, and the like on its back surface.

Note that the number of capturing devices is not limited to 25, but two or more capturing devices need only be included. Also, a plurality of capturing devices need not be laid out on a single surface, but they need only be laid out to be able to capture the same object or nearly equal regions at nearly the same time.

A CPU 201 controls a computer graphics (CG) generator 207 and display controller 204 to display a user interface (UI) on a monitor 129, and receives user instructions via an operation unit 128 and the shutter button 127. Then, the CPU 201 sets capturing conditions such as a distance to be focused at the capturing timing (to be referred to as a focus distance hereinafter), focal length, f-number, exposure time, ON/OFF of flash emission, and the like, issues a capturing instruction, and makes display settings of captured images. Note that the CG generator 207 generates data such as characters and graphics required to implement the UI.

The arrangement of the capturing apparatus 100 will be described below using the block diagram shown in FIG. 2. A microprocessor (CPU) 201 executes an OS (Operating System) and various programs stored in a ROM (Read Only Memory) 203 using a RAM (Random Access Memory) 202 as a work memory, thereby controlling respective units (to be described later) via a system bus 200. The RAM 202 stores capturing parameters (to be described later), and the ROM 203 stores camera design parameters which represent a relative positional relationship of the capturing devices 101 to 125, a pixel pitch of an image capturing device of each capturing device, and the like. Note that a ROM of each capturing device may store camera design parameters of that capturing device.

Upon reception of a capturing instruction from the user, the CPU 201 instructs an optical system controller 209 to capture an image. The optical system controller 209, which received this instruction, controls capturing optical systems, that is, it adjusts focus distances and apertures, opens/closes shutters, and so forth. The optical system controller 209 stores, in the RAM 202, capturing parameters as information indicating states of the capturing devices 101 to 125 such as focus distances, zoom settings, and the like as control results of the capturing optical systems. Note that the capturing devices 101 to 125 may include optical system controllers which can communicate with the CPU 201 in place of the single optical system controller 209, which controls the capturing optical systems of the capturing devices 101 to 125.

Each of the capturing devices 101 to 125 receives light coming from an object by an image capturing device such as a CCD (Charge Coupled Device) or CMOS sensor. Then, captured data (to be referred to as RAW data hereinafter) obtained by analog-to-digital (A/D) converting an analog signal output from the image capturing device is temporarily held in a buffer memory of each of the capturing devices 101 to 125. The RAW data held in the buffer memories are sequentially stored in a predetermined area on the RAM 202 under the control of the CPU 201.

A digital signal processor 208 executes development processing for generating image data from a plurality of RAW data (to be referred to as a RAW data group hereinafter) stored in the predetermined area on the RAM 202, and stores the RAW data group and the generated image data in the predetermined area on the RAM 202. Note that the development processing includes super resolution processing for synthesizing a plurality of RAW data, demosaicing processing, white balance processing, gamma processing, noise reduction processing, and the like. Parameters at the time of the development processing (to be referred to as image synthesis parameters hereinafter), which parameters indicate a focus distance, depth of field, and the like, are appended to image data. To the RAW data group, at least capturing parameters are appended as capturing information. In this case, in consideration of development processing by an external image processing apparatus, camera design parameters can be added to capturing information.

The CPU 201 controls a display controller 204 to display the image data stored in the predetermined area on the RAM 202 on the monitor 129. A compression/decompression unit 211 executes encode processing for converting the image data stored in the predetermined area on the RAM 202 into a format such as JPEG or MPEG, and also executes processing for losslessly compressing the RAW data group, if necessary.

An interface (I/F) 205 has, for example, a function of making read/write accesses to a recording medium 206 such as a memory card, USB (Universal Serial Bus) memory, or the like, and a function of connecting to a wired or wireless network. The I/F 205 outputs, for example, the image data having the JPEG or MPEG format and the RAW data group, which are stored in the RAM 202, to external media or a server apparatus, and inputs various data from the external media or server apparatus according to instructions from the CPU 201.

An image synthesis parameter generator 210 generates image synthesis parameters, which are required for the development processing in the digital signal processor 208, and allow the super resolution processing, as will be described in detail later.

Note that FIG. 2 shows the capturing apparatus 100 which integrates the capturing devices 101 to 125 and other units, but the capturing devices 101 to 125 and other units (image processing apparatus) may be separated. In this case, each of the capturing devices 101 to 125 and image processing apparatus may include a communication unit such as a serial bus I/F (for example, USB or IEEE1394) or a wireless network card, and may exchange control signals and data via the communication unit.

Capturing Device

The arrangement of the capturing devices 101 to 125 will be described below using the block diagram shown in FIG. 3. Note that FIG. 3 shows the arrangement of the capturing device 101, and the remaining capturing devices 102 to 125 have nearly the same arrangements.

Light coming from an object passes through a focus lens group 301, zoom lens group 302, diaphragm 303, fixed lens group 304, shutter 305, infrared cut filter 306, and color filters 307, and forms an image on an image capturing device 308 such as a CMOS sensor or CCD. An A/D converter 309 A/D-converts an analog signal output from the image capturing device 308. A buffer 310 temporarily stores RAW data output from the A/D converter 309, and transfers RAW data to the RAM 202 via the system bus 200 in response to a request from the CPU 201.

Figure 3:
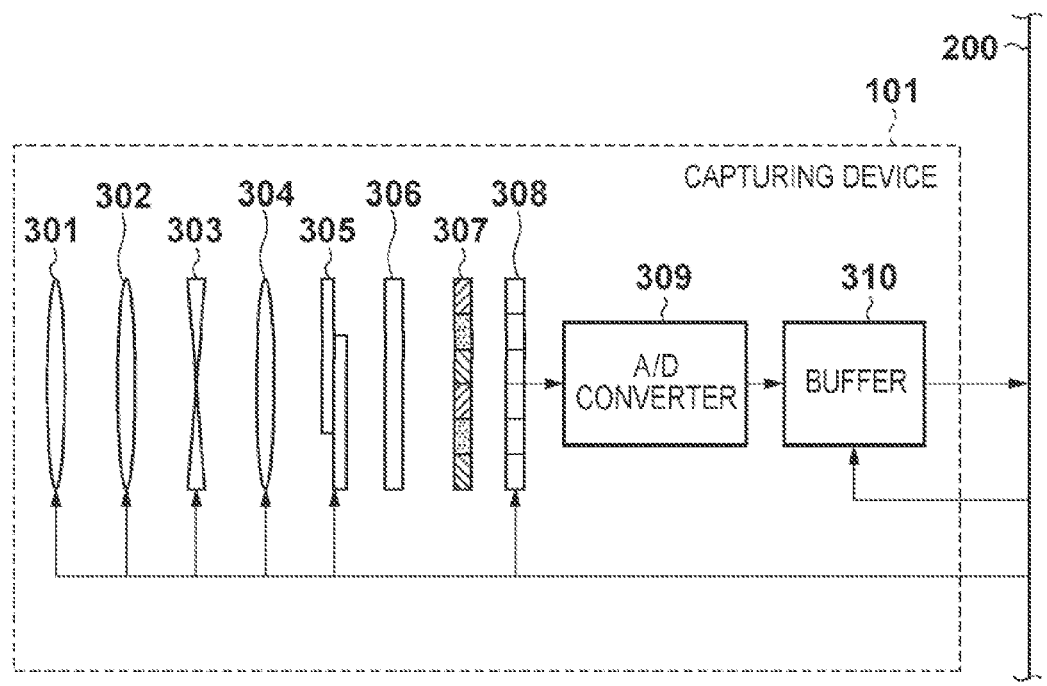
FIG. 3 is a block diagram for explaining the arrangement of a capturing device.

Note that the layout of the lens groups and diaphragm shown in FIG. 3 is an example, and different layouts may be adopted. Also, all of the capturing devices 101 to 125 need not have the same arrangement. For example, all the capturing devices need not have the same focal length, and some or all of the capturing devices may have an optical system of a fixed focal length without any zoom lens group 302. Also, some or all of the capturing devices need not have the fixed lens group 304 required to improve lens performances such as a telecentric performance.

Capturing Operation

Figure 4:
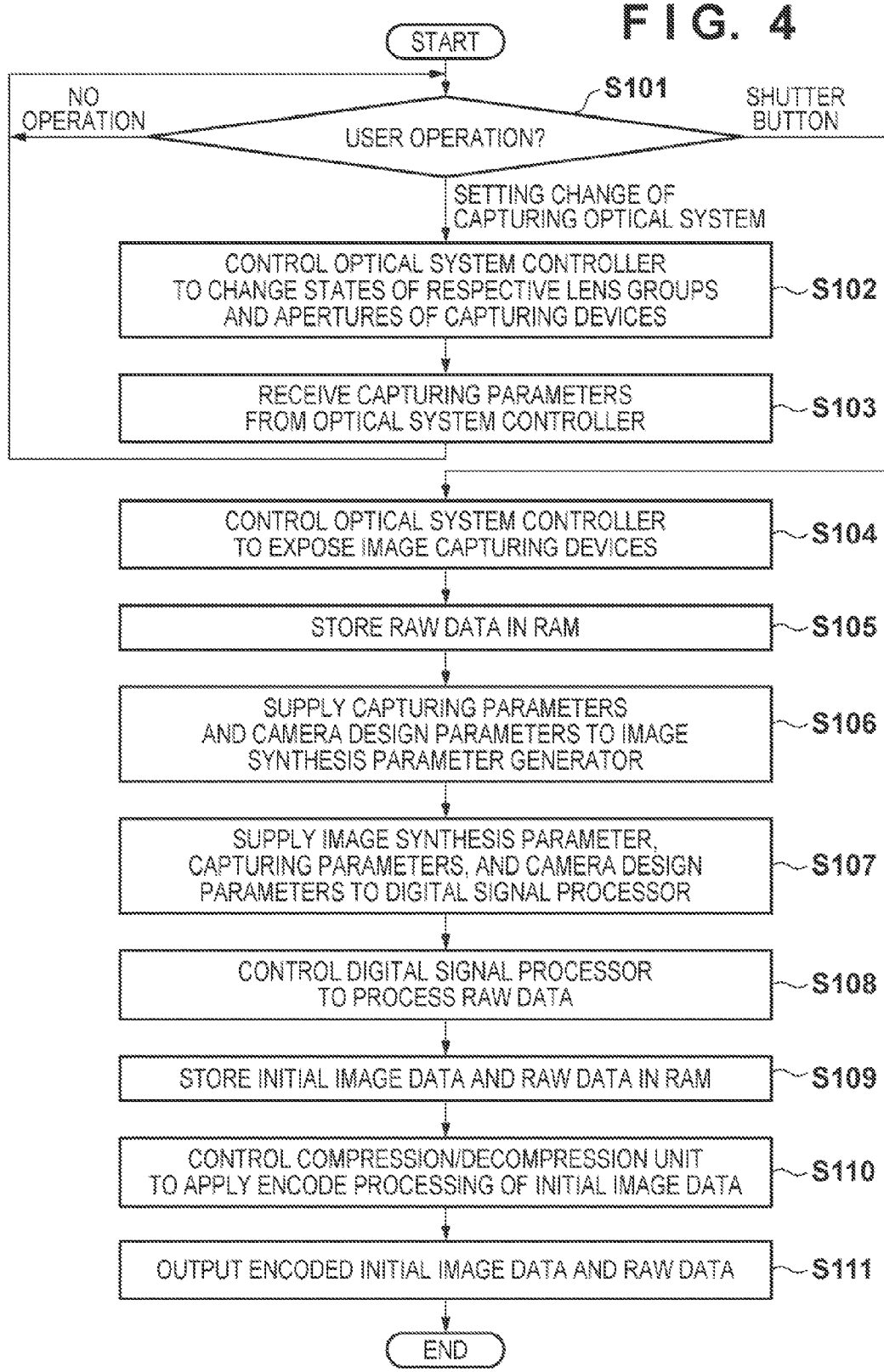
FIG. 4 is a flowchart for explaining an example of a capturing operation.

An example of a capturing operation will be described below using the flowchart shown in FIG. 4. Note that processing shown in FIG. 4 is executed by the CPU 201.

When the user operates the operation unit 128 or shutter button 127, a capturing operation is started. The CPU 201 receives a user instruction via the operation unit 128 or shutter button 127, and checks a user's operation (S101).

When the user changes settings such as a zoom, focus, f-number, and the like of the capturing optical systems by operating the operation unit 128, the CPU 201 controls the optical system controller 209 to change the states of the lens groups 301, 302, and 304 and the diaphragms 303 of the capturing devices 101 to 125 (S102). The optical system controller 209 returns capturing parameters indicating the states of the lens groups 301, 302, and 304 and the diaphragms 303 of the capturing devices 101 to 125 to the CPU 201, which stores the received capturing parameters in the predetermined area on the RAM 202 (S103).

When the user presses the shutter button 127, the CPU 201 controls the optical system controller 209 to open the shutters 305 of the capturing devices 101 to 125 by a pre-set time, thereby exposing the image capturing devices 308 (S104). After that, the CPU 201 controls the buffers 310 of the capturing devices 101 to 125 to store a RAW data group in the predetermined area on the RAM 202 (S105).

Next, the CPU 201 supplies the capturing parameters stored in the RAM 202 and the camera design parameters stored in the ROM 203 to the image synthesis parameter generator 210 (S106). Then, the CPU 201 supplies the capturing parameters, camera design parameters, and arbitrary one of image synthesis parameters generated by the image synthesis parameter generator 210 to the digital signal processor 208 (S107). The CPU 201 then controls the digital signal processor 208 to execute the development processing of the RAW data group (S108).

The digital signal processor 208 receives the RAW data group, capturing parameters, camera design parameters, and image synthesis parameter, and executes the development processing based on these data and parameters, thereby generating image data (to be referred to as initial image data hereinafter). After that, the digital signal processor 208 appends capturing information (capturing parameters and camera design parameters if necessary) to the RAW data group, and appends the image synthesis parameter used in the development processing to the initial image data. The CPU 201 stores the initial image data and RAW data group output from the digital signal processor 208 in the predetermined area on the RAM 202 (S109).

Next, the CPU 201 controls the compression/decompression unit 211 to apply encode processing to the initial image data (S110). Then, the CPU 201 controls the I/F 205 to output the encoded initial image data and the RAW data group as one file (S111). Note that an output destination of the data is, for example, the recording medium 206 or a server apparatus (not shown). Also, the RAW data group, which has undergone lossless compression by the compression/decompression unit 211, may be output.

[Re-Development Processing]

Figure 5:
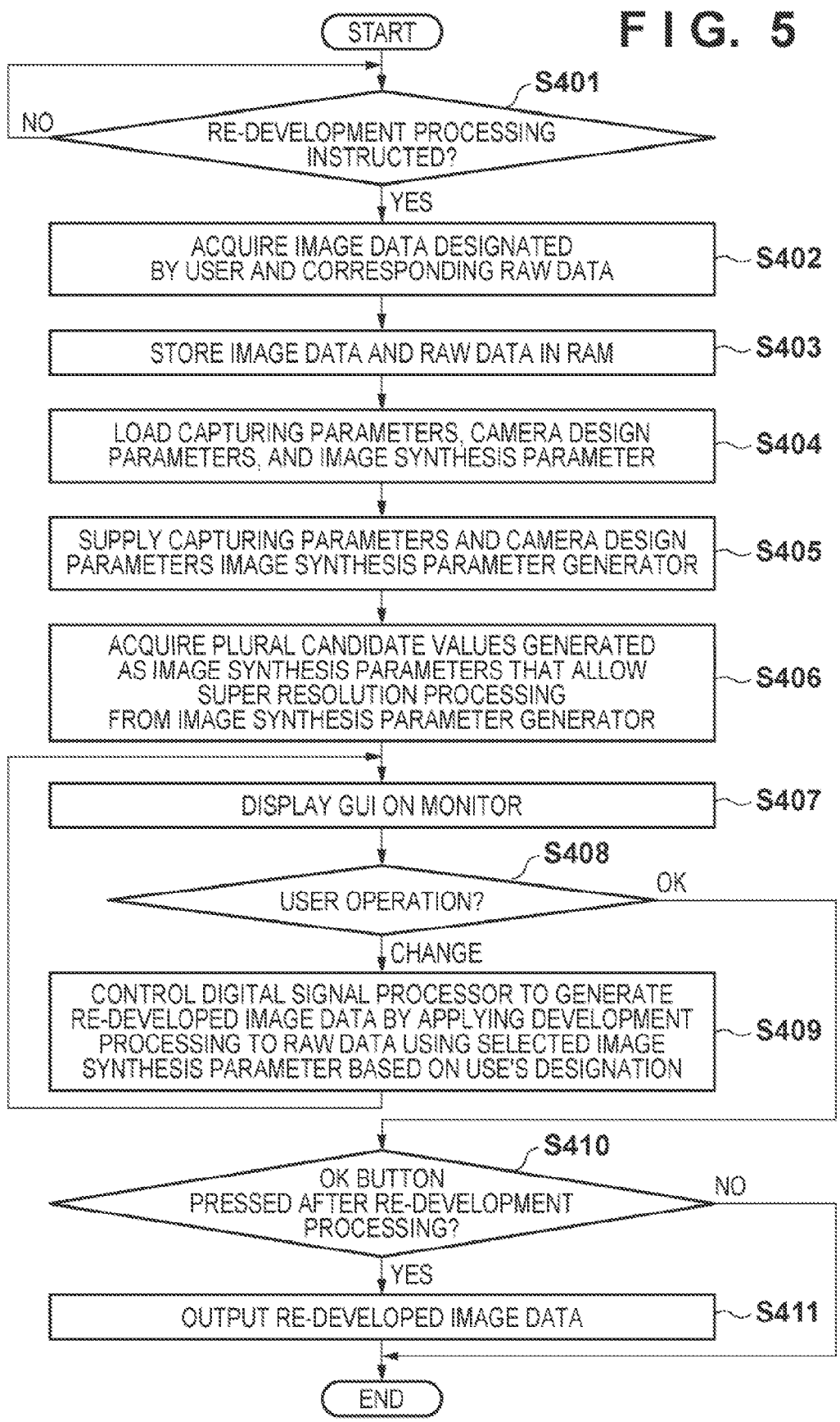
FIG. 5 is a flowchart for explaining re-development processing.

Processing for applying refocusing and depth of field control to captured image data (to be referred to as re-development processing hereinafter) will be described below. The re-development processing will be described below using the flowcharts shown in FIG. 5. Note that processes shown in FIG. 5 is executed by the CPU 201. The re-development processing is normally started in response to a user instruction input via the operation unit 128, or it may be automatically started after the capturing operation.

When the re-development processing is instructed (S401), the CPU 201 acquires image data designated by the user and the corresponding RAW data group from, for example, the recording medium 206 (S402). Then, the CPU 201 controls the compression/decompression unit 211 to apply decode processing to the image data (and also the RAW data group if necessary), and stores the decoded image data and RAW data group in the predetermined area on the RAM 202 (S403).

Note that the data acquired in step S402 need not be data captured by or image data generated by the capturing apparatus 100, and data to be acquired may be data stored in, for example, the recording medium 206 by another capturing apparatus or another image processing apparatus. However, to RAW data to be acquired, capturing parameters and camera design parameters have to be appended as capturing information. Of course, in case of a RAW data group captured by the capturing apparatus 100 itself, the camera design parameters can be acquired from the ROM 203 or the like.

Next, the CPU 201 loads the capturing information (capturing parameters and camera design parameters) from the RAW data group, and loads the image synthesis parameter from the image data (S404). The CPU 201 supplies the capturing parameters and camera design parameters to the image synthesis parameter generator 210 (S405). Then, as will be described in detail later, the CPU 201 acquires a plurality of candidate values generated as image synthesis parameters, which allow super resolution processing, from the image synthesis parameter generator 210 (S406).

The CPU 201 then controls the CG generator 207 and display controller 204 to display, on the monitor 129, a GUI (Graphical User Interface) which is required to display an image represented by the image data, and allows the user to change the image synthesis parameter within an allowable range of the super resolution processing (S407). The GUI is not that with which the user sets an arbitrary image synthesis parameter, as will be described in detail later. The user refers to an image displayed on the monitor 129, and when a desired image is obtained, he or she presses, for example, an "OK" button on the GUI; when the user wants to change the image synthesis parameter, he or she presses, for example, a "change" button on the GUI.

The CPU 201 checks the user operation (S408). If the user presses the "OK" button, the CPU 201 judges that the image data that the user wants is obtained, and ends the re-development processing.

If the user presses the "change" button, the CPU 201 controls the digital signal processor 208 to select one of a plurality of candidate values generated as image synthesis parameters based on a focus distance and depth of field, which are designated by the user via the GUI, and to generate image data obtained by applying the development processing to the RAW data group using the selected image synthesis parameter (to be referred to as re-developed image data hereinafter) (S409). Then, the process returns to step S407 to display an image represented by the re-developed image data on the GUI.

If the CPU 201 judges in step S410 that the user presses the "OK" button after the re-development processing, it outputs the re-developed image data by the same processing as that executed when the initial image data is output (S411), thus ending the re-development processing.

[Synthesis of Plural RAW Data]

Overview of Synthesis Processing

Details of processing for synthesizing a plurality of RAW data of the development processing of the digital signal processor 208 will be described below. In this synthesis processing, a resolution is increased by the super resolution processing while controlling a depth of field.

As shown in FIG. 1, the capturing devices 101 to 125 have different positions, and the RAW data group output from the capturing devices 101 to 125 configure so-called multiview images captured from a plurality of viewpoints. As a method of generating an image from the multiview images while controlling a depth of field, a synthetic aperture method is known. The synthetic aperture method includes some methods. Basically, a plurality of multiview images, which are aligned to a distance to be focused (focus distance), undergo filter processing to generate a synthetic image which has a shallower depth of field than individual images. The depth of field is adjusted by changing filters used in the filter processing or changing the number of images (the number of captured data) used in synthesis.

As a method of generating a high-resolution image from a plurality of images, the super resolution processing is known. The super resolution processing also includes some processes. Basically, a plurality of images are superposed by aligning these images, and undergo processing such as filter processing and Bayes's estimation.

In this manner, both the synthetic aperture method and super resolution processing execute post-processing after images are aligned. The digital signal processor 208 increases a resolution while controlling a depth of field by combining the synthetic aperture method and super resolution processing.

As will be described in detail later, images are aligned by calculating shift amounts of respective images corresponding to a focus distance based on the capturing parameters and camera design parameters, and transforming the respective images in correspondence with the shift amounts. Normally, objects in captured images are located at various distance positions. In an image region including objects which are located at distance positions different from the focus distance, images cannot be aligned due to parallaxes. In synthesis processing, image regions which are relatively easily aligned and those which cannot be aligned are determined, the super resolution processing is applied to the image regions which are relatively easily aligned, and processing for blurring an image using the synthetic aperture method is applied to the image regions which cannot be aligned.

Whether or not image regions are aligned is determined based on magnitudes of variances by checking the variances of color signals of image regions, which are output from different capturing devices in an aligned image. In the image regions which are satisfactorily aligned, color signals of nearly the same objects are output even from different capturing devices, and variances of color signals are reduced. Conversely, in image regions which are not aligned, variances of color signals become large.

Position Shift Amount

Position shift amounts depend on zoom settings (field angles) of the capturing devices, positions, orientations, and pixel pitches of the capturing devices, and a focus distance. The following ideal conditions will be examined. Under the ideal conditions, image alignment is achieved by only translations of images.

The capturing devices are laid out to be superposed on other capturing devices by translations on a plane perpendicular to their optical axes.

Distortions and the like of optical systems of the capturing devices are sufficiently small and negligible.

All the optical systems of the capturing devices have the same focal length f.

In all the capturing devices, the image capturing devices have the same pixel pitch and the same number of pixels.

Letting N be the number of capturing devices, an image output from the first capturing device (capturing device 1) is used as a reference image for alignment. Also, let $\Delta x_j$ and $\Delta y_j$ be position shift amounts respectively in the horizontal and vertical directions of an image output by a j-th capturing device (capturing device j) with respect to the reference image. Let $Lx_j$ and $Ly_j$ be distances (so-called base lengths) in the horizontal and vertical directions between the capturing devices 1 and j. Furthermore, let $\Delta_x$ and $\Delta_y$ be pixel pitches in the horizontal and vertical directions of the image capturing device. At this time, position shift amounts required to align an object at a distance z are calculated by:

$$\Delta x_j = Lx_j \cdot f / (z \cdot \Delta_x)$$

$$\Delta y_j = Ly_j \cdot f / (z \cdot \Delta_y) \quad (1)$$

Images are aligned based on these position shift amounts, and then undergo the super resolution processing or processing based on the synthetic aperture method, thus synthesizing a plurality of RAW data. In this connection, the focal length f corresponds to one of the capturing parameters, and the base lengths $Lx_j$ and $Ly_j$ correspond to ones of the camera design parameters.

The above description is a simple calculation example of the position shift amounts. In a more general case, for example, when the capturing devices have arbitrary positions and orientations, and the focal length f and pixel pitches $\Delta_x$ and $\Delta_y$ are different for respective capturing devices, position shift amounts depend on pixel positions in images. For this reason, in place of calculating position shift amounts in the entire images, as descried above, position shift amounts are locally calculated.

That is, a position on the reference image, which corresponds to a point which is located at a pixel position $(x_j, y_j)$ of a j-th image (image j) and at a focus distance, is calculated. This calculation uses known perspective projection transformation and its inverse transformation. An overview of the perspective projection transformation will be described below. From a certain pixel position $(x_j, y_j)$ of the image j and the focus distance z, a position (X, Y, Z) of an object on a so-called world coordinate system is calculated by the inverse transformation of the perspective projection. This world coordinate system is preferably set to be common to a camera coordinate system of the reference capturing device 1.

Next, the position (X, Y, Z) of the object on the world coordinate system is transformed to a pixel position $\{x_1(x_j, y_j), y_1(x_j, y_j)\}$ on an image 1 by perspective projection transformation in the capturing device 1. This processing is applied to all pixels of the image j, thereby deciding a correspondence relationship of pixel positions between the images j and 1. In this manner, even in a more general case, alignment can be attained by transforming images.

Note that when individual images suffer aberrations due to distortions, existing distortion correction is applied to respective pixel positions, and inverse projection transformation and projection transformation are then applied, thereby deciding a correspondence relationship of pixel positions.

Generation of Image Synthesis Parameter which Allows Super Resolution Processing The image synthesis parameter generator 210 generates image synthesis parameters based on the capturing parameters and camera design parameters supplied from the CPU 201. Alternatively, a table which records image synthesis parameters corresponding to the capturing parameters and camera design parameters is stored in the ROM 203. Then, the image synthesis parameter generator 210 may acquire, from the table, image synthesis parameters corresponding to the capturing parameters and camera design parameters supplied from the CPU 201.

The super resolution processing synthesizes a plurality of first images having a first resolution, and outputs a second image which has a larger number of pixels than the first image (which has a second resolution higher than the first resolution). This processing is allowed when the plurality of capturing devices sample different regions of an object, that is, when images include position shifts. If all the capturing devices sample quite the same region of the object, images do not include any position shift, and it is impossible to execute the super resolution processing.

Figure 6A:
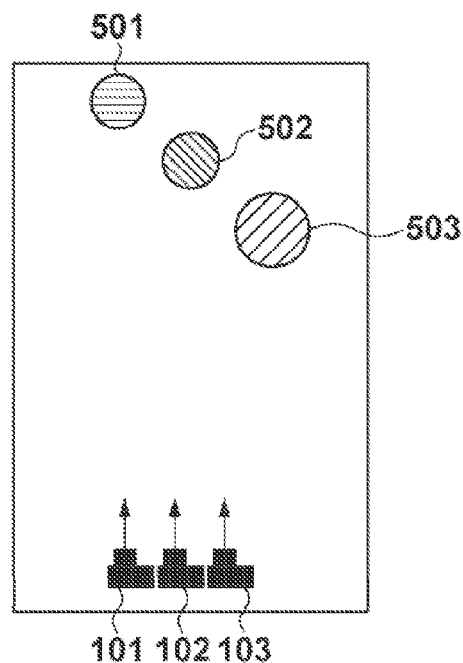
FIGS. 6A to 6D are top views of a situation in which three cylinders as objects are to be captured by three capturing devices.
Figure 6B:
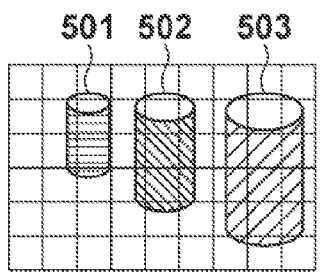
Figure 6C:
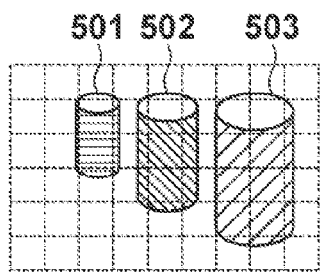
Figure 6D:
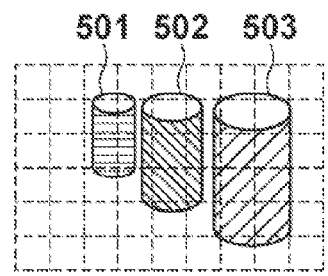

FIGS. 6A to 6D are top views of a situation in which three cylinders 501 to 503 as objects are captured by the three capturing devices 101 to 103. By the capturing operation shown in FIG. 6A, images shown in FIGS. 6B, 6C, and 6D are respectively obtained by the capturing devices 101, 102, and 103. Assume that rectangular frames shown in FIGS. 6B, 6C, and 6D represent pixels.

Figure 7A:
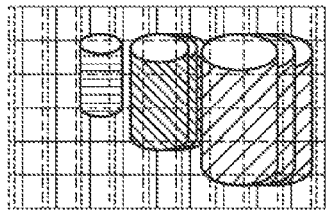
FIGS. 7A to 7C are views for explaining images after synthesis processing.
Figure 7B:
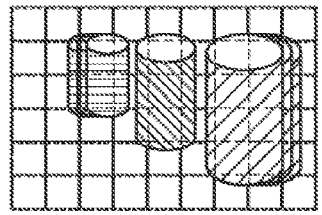
Figure 7C:
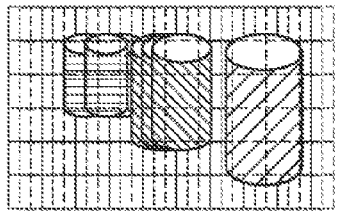

Images after synthesis processing will be described below with reference to FIGS. 7A to 7C. For example, when images are aligned so as to focus, for example, a distance at which the backmost cylinder 501 is located, and the super resolution processing is executed, images of the cylinder 501 are superposed, but the rectangular frames are shifted little by little, that is, position shifts occur, as can be seen from FIG. 7A. The same applies to a case in which a distance at which the frontmost cylinder 503 is located is focused (FIG. 7C). On the other hand, when a distance at which the cylinder 502 of an intermediate distance is focused, the rectangular frames are free from position shifts, as shown in FIG. 7B, and in this case, it is impossible to execute the super resolution processing.

Figure 8:
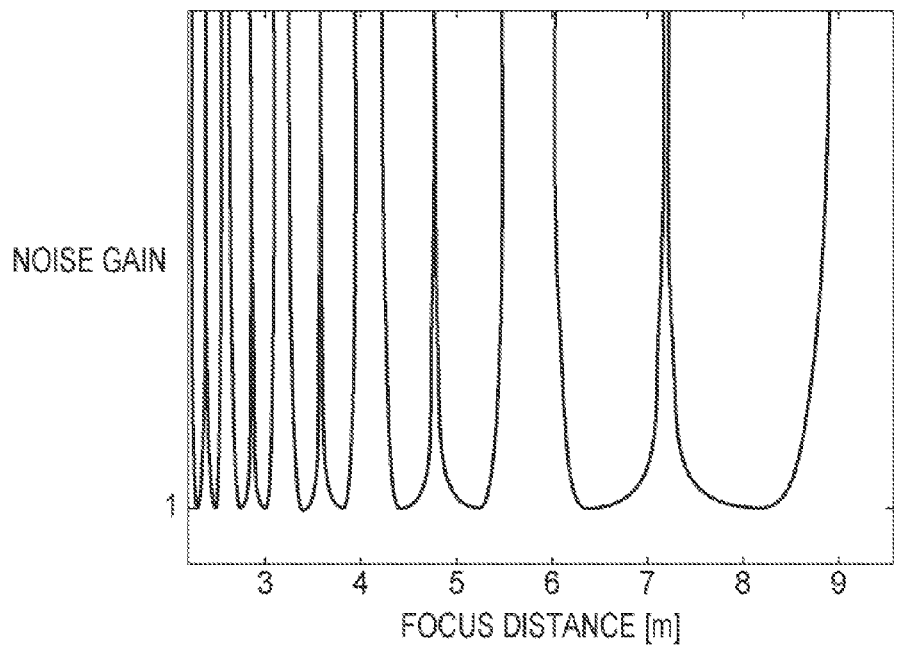
FIG. 8 is a graph showing an example of a noise gain.

In general, the super resolution processing amplifies noise. The super resolution processing is allowed even when the position shift amounts are small if noise amplification is not taken into consideration. However, noise is preferably reduced as much as possible, and position shift amounts of certain magnitudes are required. FIG. 8 shows an example of a noise gain. Position shift amounts change depending on a focus distance, and a noise gain is also different accordingly. At a focus distance where noise is extremely amplified, position shift amounts are very small. In other words, whether or not the super resolution processing is allowed can be determined by focusing attention on the position shift amounts of images obtained from the plurality of capturing devices.

The super resolution processing which uses, as the number of pixels of an output image, a value obtained by multiplying the number of pixels of each input image by the number of images to be synthesized under the above ideal conditions will be examined first. That is, if the number of input images is four, an output image is generated by doubling the number of pixels of each input image respectively in the horizontal and vertical directions. In this case, the following equation may be used as an evaluation value E1 required to determine whether or not the super resolution processing is allowed.

$$E1 = \Sigma_{lm} |X_{([N/2][N/2](lm)}|^2 \quad (2)$$

where X is an inverse matrix of a matrix M, components of which are expressed by:

$$M_{(jk)(lm)} = \exp[i2\pi\{(j-[N/2])\Delta x_l + (k-[N/2])\Delta y_m\}] \quad (3)$$

where j and k, and l and m assume a value ranging from 1 to N,

N is the number of input images,

[N/2] is a Gaussian symbol, and indicates an integer not more than N/2, and a size of the matrix M is $N^2 \times N^2$.

The evaluation value E1 has a correlation with a noise gain. When the evaluation value E1 corresponding to an allowable noise gain is set in advance as a threshold th1, and the evaluation value E1 does not exceed the threshold th1 (E1≤th1), it is determined that the super resolution processing is allowed.

The evaluation value E1 depends on position shift amounts $\Delta x_l$ and $\Delta y_m$, which depend on the object distance z, in other words, the focus distance, as given by equation (1). Also, the evaluation value E1 depends on the number of images to be used, which is decided according to the control of a depth of field of an output image. That is, the evaluation value E1 depends on the image synthesis parameter. Therefore, whether or not the super resolution processing is allowed is determined for various image synthesis parameters based on the evaluation value E1, and a plurality of candidate values are generated as the image synthesis parameter which allows the super resolution processing.

Alternatively, a simpler evaluation value E2 can also be used. A certain image synthesis parameter is set, and a decimal part of the position shift amount $\Delta x_j$ in the horizontal direction of the image j with respect to the image 1 is calculated. For example, if there are four images, and position shift amounts $\Delta x_j$ with respect to the image 1 are 0.1, 1.5, 5.9, and 3.2, decimal parts of the position shift amounts are 0.0, 0.5, 0.9, and 0.2.

Next, the decimal parts of the position shift amounts are arranged in turn (that is, 0.0, 0.2, 0.5, 0.9), and a minimum value of their intervals is calculated. In this case, it should be noted that pixels on an image are repeated. In this example, an interval "0.2" between "0.0" and "0.2" is not a minimum value, but "0.0" is considered as "1.0", and an interval "0.1" between "1.0" and "0.9" is a minimum value. Likewise, a maximum value of the intervals of the decimal parts of the position shift amounts is calculated. In this example, an interval "0.4" between "0.5" and "0.9" is a maximum value.

Next, a ratio (maximum value/minimum value) of the intervals is calculated. In this example, the ratio is 0.4/0.1=4.0.

The aforementioned evaluation is similarly executed also in the vertical direction. Of the obtained two ratios, a larger value is selected as the evaluation value E2. Then, when the evaluation value E2 is smaller than a predetermined threshold th2 (E2<th2), it is determined that the super resolution processing is allowed. By making this determination for various image synthesis parameters, a plurality of candidate values can be generated as image synthesis parameters which allow the super resolution processing.

The case has been exemplified wherein a plurality of candidate values are generated as image synthesis parameters which allow the super resolution processing under the ideal conditions. A more general case, for example, a case in which a plurality of candidate values are generated as image synthesis parameters which allow the super resolution processing when the capturing devices have arbitrary positions and orientations, and focal lengths f and pixel pitches $\Delta_x$ and $\Delta_y$ are also different for the respective capturing devices will be described below.

As described above, in a more general case, the position shift amounts depend on pixel positions in images. In this case, correspondence between respective pixel positions of images other than the reference image and those on the reference image is obtained by repeating the inverse perspective projection transformation and perspective projection transformation, as described above. The correspondence relationship of pixel positions depends on an image synthesis parameter.

The correspondence relationship of pixel positions will be described below with reference to FIGS. 9A and 9B. In FIGS. 9A and 9B, circular symbols (○), upward triangular symbols (△), downward triangular symbols (▽), and square symbols (□) indicate pixel positions on images of the respective capturing devices. That is, differences of the symbols indicate differences of the capturing devices. FIGS. 9A and 9B show differences of pixel positions obtained by differences of image synthesis parameters. As shown in FIG. 9A, an image synthesis parameter with which pixel positions are distributed nearly uniformly allows the super resolution processing. On the other hand, in case of an image synthesis parameter with which pixel positions are concentrated, as shown in FIG. 9B, a satisfactory image cannot be obtained even when the super resolution processing is executed. Based on such correspondence relationship of pixel positions, whether or not the super resolution processing is allowed is determined.

Next, a simple determination method in a more general case will be explained below. At each pixel position of the image 1, the number of pixels of other images, which pixels are included in a rectangular region which has that pixel position as the center and matches a pixel size of an output image, is counted. Then, an average value of count values of respective pixel positions is calculated. When the average value is closer to zero, it indicates that pixel positions are uniformly distributed at a scale of interest, and the super resolution processing is allowed. On the other hand, when the average value largely exceeds 1, pixel positions tend to be concentrated, and it is determined that a satisfactory super resolution processing result cannot be obtained.

The case of the super resolution processing, which uses, as the number of pixels of an output image, the value obtained by multiplying the number of pixels of each input image by the number of images to be synthesized (to be referred to as the number of all input pixels hereinafter), has been described. Also, when the number of pixels of an output image is smaller than the number of all input pixels, the aforementioned determination method is applicable.

When pixel positions are distributed uniformly, an expected value of the average value calculated by the above method is the number of pixels of an input image per pixel of the output image when the central pixel itself is excluded. That is, the expected value is a value obtained by subtracting 1 from a value obtained by dividing the number of all input pixels by the number of pixels of the output image. For example, when the number of pixels of each input image is ten millions, the number of input images is 20, and the number of pixels of the output image is twenty millions, the expected value is $10000000 \times 20/20000000 - 1 = 9$. When the actually calculated average value is closer to this expected value, it can be determined that the super resolution processing is allowed. When the average value largely exceeds the expected value, it can be determined that a satisfactory super resolution processing result cannot be obtained.

For example, when the average value is 19, it indicates a situation in which pixel positions are concentrated, as shown in FIG. 9B, and a satisfactory super resolution processing result cannot be obtained. By making this determination for various image synthesis parameters, a plurality of candidate values are generated as image synthesis parameters which allow the super resolution processing.

In this manner, the image synthesis parameter generator 210 determines based on position shift amounts of a plurality of RAW data to be synthesized whether or not a processing result of the super resolution processing using each of a plurality of image synthesis parameters is satisfactory, and selects image synthesis parameters which allow to obtain satisfactory processing results as candidate values.

The aforementioned determination method is an example, and any other determination methods may be used as long as a plurality of candidate values can be generated as image synthesis parameters which allow the super resolution processing.

[GUI]

Figure 10:
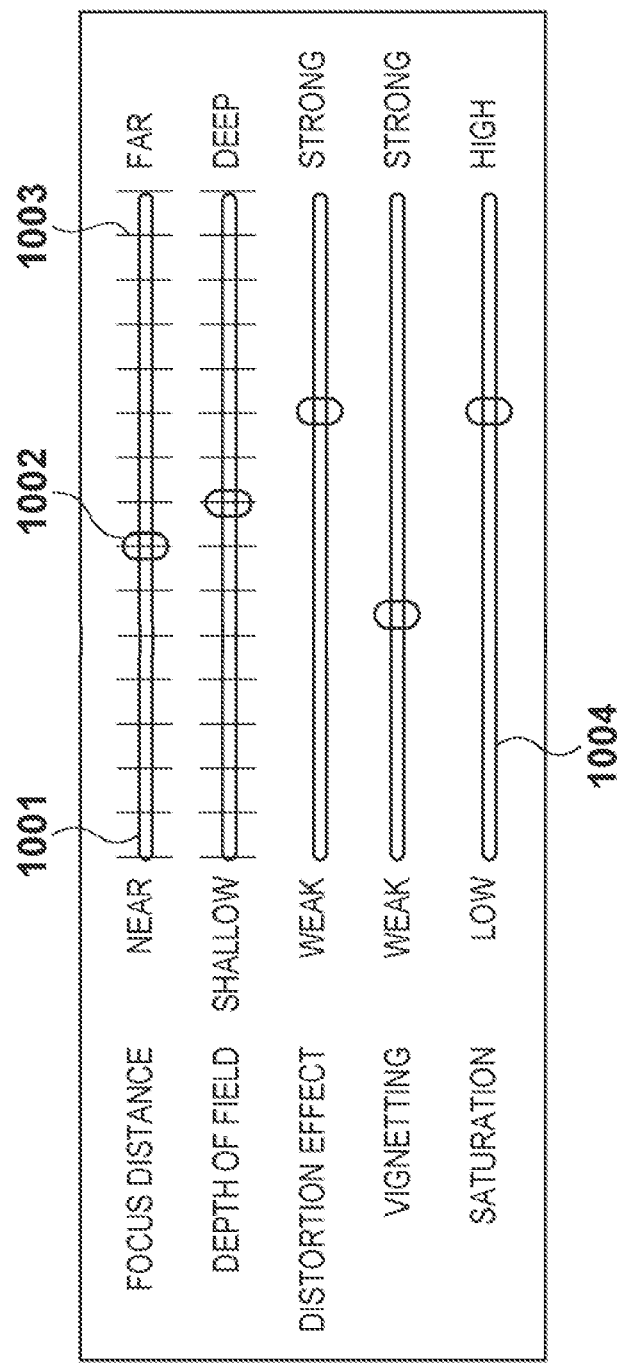
FIG. 10 is a view showing an example of a GUI displayed on a monitor.

FIG. 10 shows an example of a GUI displayed on the monitor 129.

The GUI is used not to allow the user to set an arbitrary image synthesis parameter, but to prompt the user to substantially select an image synthesis parameter within an allowable range of the super resolution processing.

A sliding bar 1001 corresponds to an allowable distance range of the super resolution processing, and the user adjusts a focus distance by operating a slider 1002. Scales 1003 displayed on the sliding bar 1001 correspond to allowable distances of the super resolution processing, and the user cannot set the slider 1002 at positions other than the scales 1003. The same applies to a depth of field. Note that when there are a large number of candidate values of an image synthesis parameter which allows the super resolution processing, the scales 1003 may not often be displayed. In such case, the slider 1002 is moved continuously as if an image synthesis parameter were continuously set. However, even in such case, an image synthesis parameter which allows the super resolution processing is selected.

shown in FIG. 10 includes sliding bars such as a focus distance, depth of field, distortion effect, vignetting, and the like, which influence the super resolution processing results. However, like a sliding bar 1004 used to adjust a saturation level of an image, a sliding bar used to set a parameter which does not largely influence the super resolution processing result may be included.

As described above, the GUI allows the user to substantially select only one of a plurality of candidate values generated as image synthesis parameters which allow the super resolution processing. In other words, the user can select an image synthesis parameter which allows appropriate processing when a plurality of captured data are to be synthesized. Using the set image synthesis parameters, a plurality of RAW data captured by the plurality of capturing devices are synthesized, thus implementing refocusing and depth of field control. Therefore, synthesis processing using an image synthesis parameter with which a satisfactory super resolution processing result cannot be obtained is avoided, thus preventing a low-resolution image and low-quality image from being generated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-104745, filed May 9, 2011 and 2012-087938, filed Apr. 6, 2012, which are hereby incorporated by reference herein in their entirety.

What is claimed is:

1. An image processing apparatus comprising:
an input section configured to input a plurality of pieces of first image data having a first resolution obtained by capturing images from a plurality of viewpoints;
a synthesizer configured to align and synthesize the plurality of pieces of first image data to generate second image data having a second resolution higher than the first resolution;
a setting section configured to set as candidates for a synthesis parameter to be used for the synthesis, a plurality of synthesis parameters which are included in synthesis parameters eligible to be candidates and which meet a condition required to achieve predetermined image quality of the second image data, wherein each synthesis parameter indicates a position shift amount of the first image data used for the alignment; and a selector configured to select one of the synthesis parameters set as candidates based on a user input, wherein the synthesizer is configured to generate the second image data using the synthesis parameter selected by the selector, wherein at least one of the input section, the setting section, the selector, or the synthesizer is implemented by a processor of the image processing apparatus.

2. The apparatus according to claim 1, wherein the synthesizer generates the second image data by super resolution processing using the synthesis parameter selected by the selector.

3. The apparatus according to claim 1, wherein the setting section determines, based on position shift amounts between the plurality of pieces of first image data indicated by the synthesis parameter, whether or not each of the synthesis parameters meet the condition required to achieve the predetermined image quality of the second image data, and sets the candidates for the synthesis parameter to be used for the synthesis.

4. The apparatus according to claim 1, further comprising an adjustor configured to adjust a focus distance of the second image data, wherein the selector selects the synthesis parameter based on the focus distance indicated by the user input.

5. The apparatus according to claim 1, further comprising:
an adjustor configured to adjust a depth of field of the second image data, wherein the selector selects the synthesis parameter based on the depth of field indicated by the user input.

6. The apparatus according to claim 1, wherein the input section is further configured to input capturing information of the plurality of pieces of first image data, and wherein the capturing information includes capturing parameters of respective pieces of the first image data, and design parameters of a plurality of capturing devices used in the capture.

7. The apparatus according to claim 6, wherein the capturing parameters indicate focus distances of corresponding pieces of the first image data, and the design parameters indicate a relative positional relationship of the plurality of capturing devices, and pixel pitches of image capturing devices of the respective capturing devices.

8. The apparatus according to claim 6, wherein the image processing apparatus comprises the plurality of capturing devices.

9. An image processing method comprising:
using a processor to perform the steps of:
inputting a plurality of pieces of first image data having a first resolution obtained by capturing images from a plurality of viewpoints;

aligning and synthesizing the plurality of pieces of first image data to generate second image data having a second resolution higher than the first resolution;

setting, as candidates for a synthesis parameter to be used for the synthesis, a plurality of synthesis parameters which are included in synthesis parameters eligible to be candidates and which meet a condition required to achieve predetermined image quality of the second image data, wherein each synthesis parameter indicates a position shift amount of the first image data used for the alignment; and selecting one of the synthesis parameters set as the candidates based on a user input, wherein, in the aligning and synthesizing step, the second image data is generated using the synthesis parameter selected in the selecting step.

10. A non-transitory computer readable medium storing a computer-executable program for causing a computer to perform the method according to claim 9.

11. The apparatus according to claim 1, wherein achieving the predetermined image quality of the second image data includes the second image data having higher resolution than a predetermined resolution and/or the second image data being less noisy than a predetermined extent.

12. The apparatus according to claim 1, further comprising:
a generating section configured to generate a graphical user interface for a user to set a focus state of the second image data, wherein the selector selects the synthesis parameter used for the synthesis based on a user input to set the focus state of the second image data input through the graphical user interface generated by the generating section.

13. The apparatus according to claim 12, wherein the graphical user interface includes a display image indicating which of a plurality of focus states that can be set as the focus state of the second image data correspond to the candidates for a synthesis parameter used for the synthesis set by the setting section.

14. The apparatus according to claim 1, further comprising:
a restricting section configured to restrict a user input from selecting a synthesis parameter that is not set as the candidate to be the synthesis parameter used for the synthesis.

15. An image processing apparatus configured to supply a user interface for setting a focus state of second image data, having second resolution, generated by aligning and synthesizing a plurality of pieces of first image data, having a first resolution lower than the second resolution, obtained by capturing images from a plurality of viewpoints, comprising:
a setting section configured to set, as focus states for the synthesis, a plurality of focus states corresponding to position shift amounts of the first image data used for the alignment that meet a condition required to achieve a predetermined image quality of the second image data; and a generating section configured (i) to generate a graphical user interface for a user to set the focus state of the second image data, wherein the graphical user interface is an interface for a user to select a focus state of the second image data from a plurality of focus states that can be set as the focus state of the second image data, and (ii) to generate, as the graphical user interface, a display image that indicates which of the plurality of focus states that can be set as the focus state of the second image data is set as the focus state by the setting section, wherein at least one of the setting section or the generating section is implemented by a processor.

16. The apparatus according to claim 15, wherein the focus state includes a focus distance and/or a depth of field.

17. An image processing apparatus configured to supply a user interface for setting a focus state of second image data, having second resolution, generated by aligning and synthesizing a plurality of pieces of first image data, having a first resolution lower than the second resolution, obtained by capturing images from a plurality of viewpoints, comprising:

a setting section configured to set, as focus states for the synthesis, a plurality of focus states corresponding to position shift amounts of the first image data used for the alignment that meet a condition required to achieve a predetermined image quality of the second image data;

a generating section configured to generate a user interface for a user to set a focus state of the second image data; and a restricting section configured to restrict selection of a focus state that is not set as the focus states in setting the focus state of the second image data using the user interface, wherein at least one of the setting section, the generating section, or the restricting section is implemented by a processor.

18. The apparatus according to claim 17, wherein the restricting section is configured to prohibit selecting the focus state that is not set as the focus states in setting the focus state of the second image data.

* * * * *